(12) United States Patent
Ueno

(10) Patent No.: US 9,236,798 B2
(45) Date of Patent: Jan. 12, 2016

(54) DC-DC CONVERTER CONTROL CIRCUIT AND DC-DC CONVERTER

(71) Applicant: KABUSHIKI KAISHA TOSHIBA, Minato-ku, Tokyo (JP)

(72) Inventor: Takeshi Ueno, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/199,540

(22) Filed: Mar. 6, 2014

(65) Prior Publication Data

US 2014/0340061 A1    Nov. 20, 2014

(30) Foreign Application Priority Data

May 17, 2013    (JP) .................................. 2013-105539

(51) Int. Cl.
*G05F 1/00* (2006.01)
*H02M 3/156* (2006.01)

(52) U.S. Cl.
CPC ...... *H02M 3/156* (2013.01); *H02M 2003/1566* (2013.01)

(58) Field of Classification Search
CPC ..................................................... H02M 3/156
USPC ................................................. 323/282–288
See application file for complete search history.

(56) References Cited

U.S. PATENT DOCUMENTS

| | | | | |
|---|---|---|---|---|
| 6,023,194 | A  * | 2/2000 | Madaffari | ..................... 330/277 |
| 7,492,132 | B2 * | 2/2009 | Kuroiwa et al. | ............... 323/222 |
| 7,538,535 | B2 * | 5/2009 | McDonald et al. | ........... 323/288 |
| 8,653,803 | B2 * | 2/2014 | Kawagishi et al. | ........... 323/284 |
| 2012/0242300 | A1 | 9/2012 | Ueno et al. | |
| 2013/0148388 | A1* | 6/2013 | Yang et al. | ................. 363/21.17 |

FOREIGN PATENT DOCUMENTS

JP         4811850 B2    11/2011
JP    2012-205352 A    10/2012

* cited by examiner

*Primary Examiner* — Timothy J Dole
*Assistant Examiner* — Htet Z Kyaw
(74) *Attorney, Agent, or Firm* — Holtz, Holtz, Goodman & Chick PC

(57) ABSTRACT

A DC-DC converter control circuit has an inductor configured to be interposed between a first node which is set to a first direct current voltage or a second direct current voltage and a second node which outputs an output voltage at a predetermined direct current voltage level, an error signal generator configured to generate an error signal depending on a voltage difference between a reference voltage and a voltage correlating with the output voltage, a ripple extractor configured to extract and output ripple components contained in the voltage of the first node, a single-ended signal generator configured to generate a single-ended signal based on the error signal and an output signal from the ripple extractor, and a switch drive unit configured to drive and control, based on the single-ended signal, a switch circuit which sets the first node to the first direct current voltage or the second direct current voltage.

12 Claims, 3 Drawing Sheets

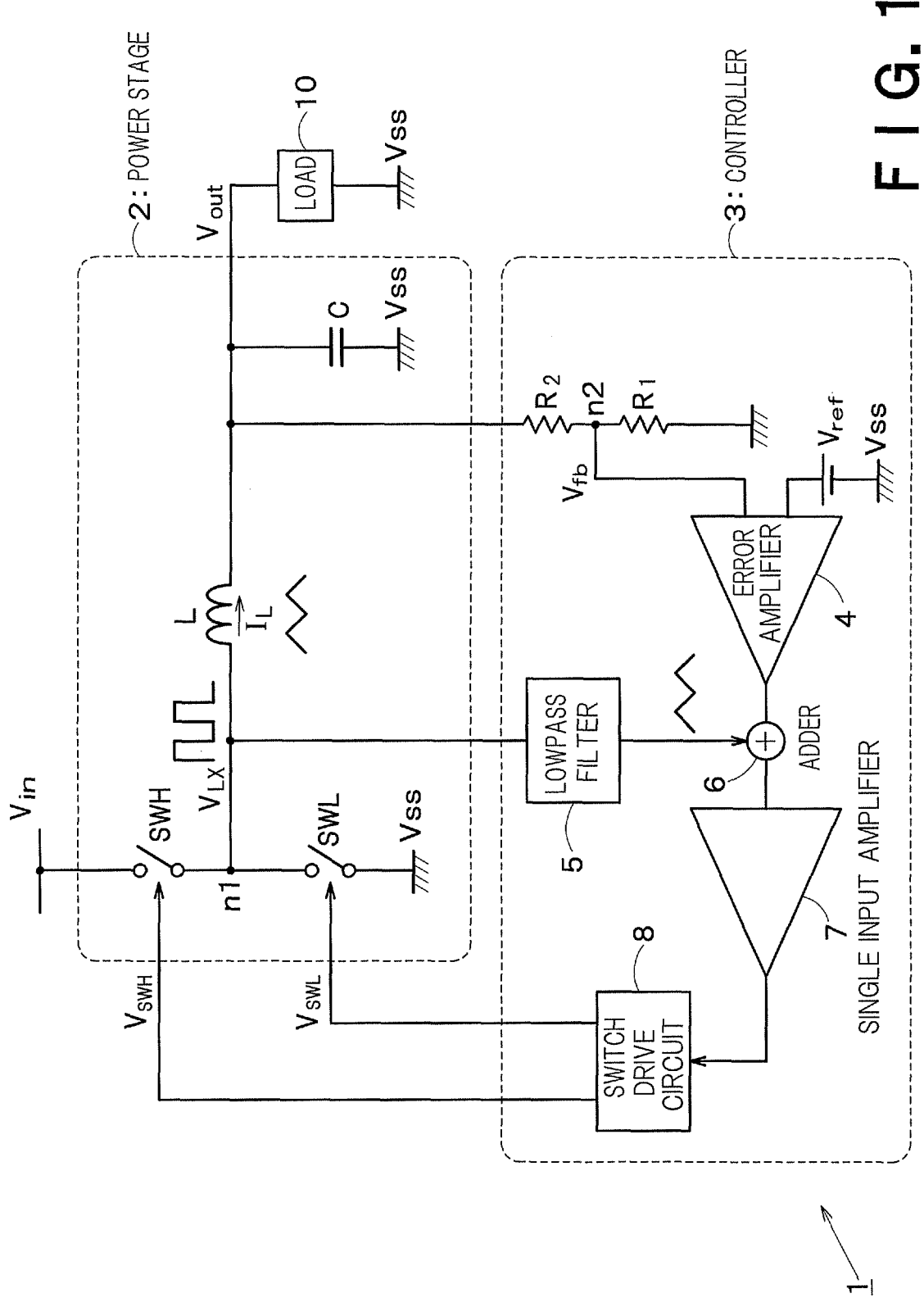
F I G. 1

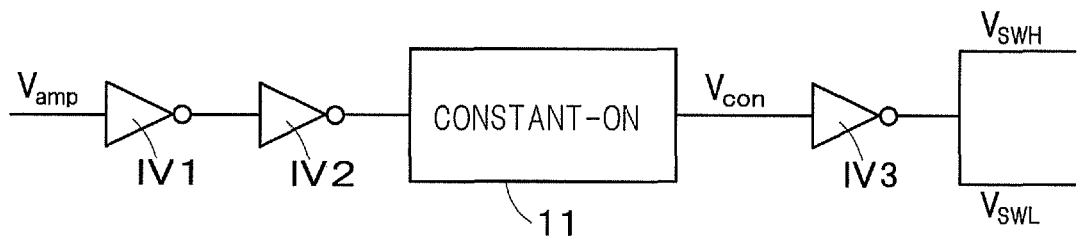
F I G. 3
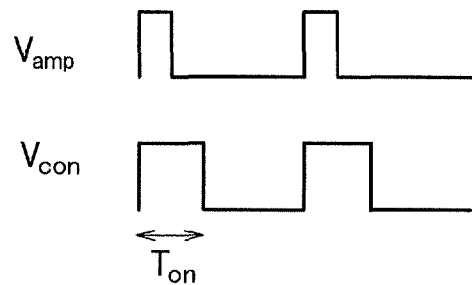
F I G. 4
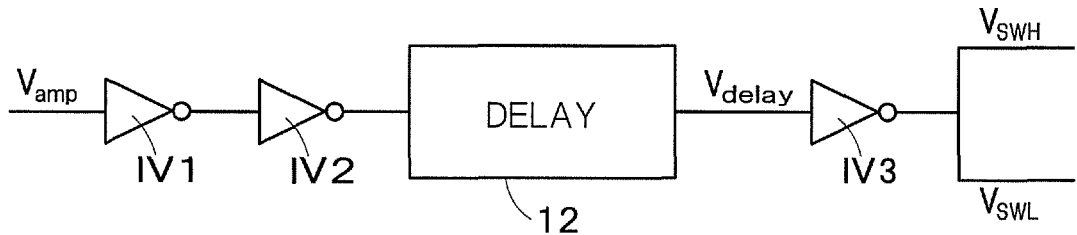
F I G. 5
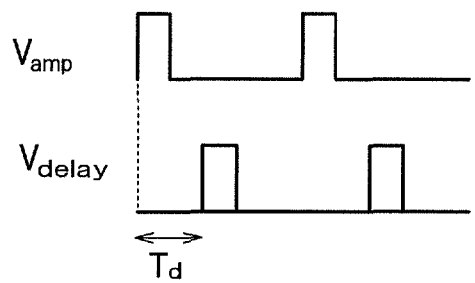
F I G. 6

US 9,236,798 B2

DC-DC CONVERTER CONTROL CIRCUIT AND DC-DC CONVERTER

CROSS REFERENCE TO RELATED APPLICATIONS

This application is based upon and claims the benefit of priority from the prior Japanese Patent Application No. 2013-105539, filed on May 17, 2013, the entire contents of which are incorporated herein by reference.

FIELD

Embodiments of the present invention relate to a DC-DC converter control circuit and a DC-DC converter.

BACKGROUND

Miniaturization of semiconductor elements has reduced power-supply voltage of ICs. However, circuit scale of the semiconductor elements has been increased, which leads to the increase in operating current. As for devices driven by batteries, operating current greatly varies since their circuits are controlled to be repeatedly activated and stopped to extend battery life.

A DC-DC converter for supplying power to such devices is required to make output voltage constant even when output current changes, which leads to the need to broaden as much as possible the range of output current which can keep the output voltage at a desired level.

As an important index to keep the output voltage of the DC-DC converter constant, speed of response to the change in the output current is used. That is, even when operating current of an IC serving as a load on the DC-DC converter suddenly changes, it is required to keep the output voltage at a desired voltage value by controlling the DC-DC converter at high speed.

A ripple control DC-DC converter is known as a DC-DC converter achieving a fast response to the variation in the output current. In the ripple control DC-DC converter, a switch drive signal is generated based on voltage ripples in a power stage, and switching is performed through self-excitation. Since there is no need to supply a clock signal from the outside, operation speed is not limited by clock frequency, which realizes a fast response to load variation.

When performing ripple control, it is general to input, into a differential input comparator, a ripple control signal and an error signal obtained by comparing the output voltage with reference voltage. However, there is a problem that great power consumption of the differential input comparator deteriorates conversion efficiency when the output current of the DC-DC converter is small (i.e., at the time of a light load.)

BRIEF DESCRIPTION OF THE DRAWINGS

FIG. 1 is a block diagram showing a schematic structure of a DC-DC converter 1 according to a first embodiment.

FIG. 3 is a circuit diagram showing a first example of the internal structure of a switch drive circuit 8 of FIG. 2.

FIG. 4 is a signal waveform diagram of a single-ended signal outputted from a single-input amplifier 7 of FIG. 3 and an output signal from a pulse width converter 11.

FIG. 5 is a circuit diagram showing a second example of the internal structure of the switch drive circuit 8 of FIG. 2.

FIG. 6 is a signal waveform diagram of a single-ended signal outputted from the single-input amplifier 7 of FIG. 5 and an output signal from the delay unit 12.

DETAILED DESCRIPTION

Figure 2:
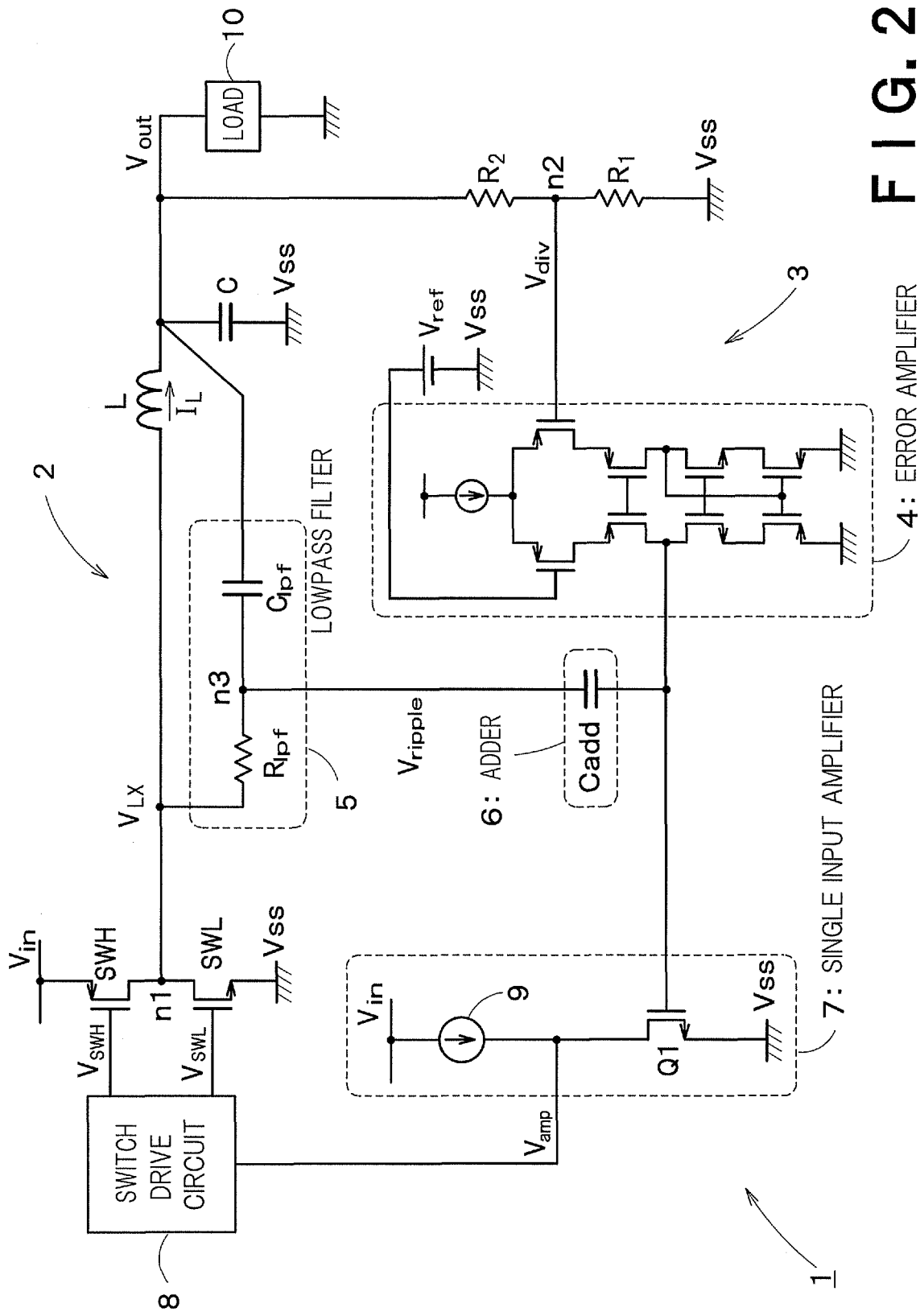
FIG. 2 is a circuit diagram of the DC-DC converter 1 according to a second embodiment.

According to one embodiment, a DC-DC converter control circuit has an inductor configured to be interposed between a first node which is set to a first direct current voltage or a second direct current voltage and a second node which outputs an output voltage at a predetermined direct current voltage level, an error signal generator configured to generate an error signal depending on a voltage difference between a reference voltage and a voltage correlating with the output voltage, a ripple extractor configured to extract and output ripple components contained in the voltage of the first node, a single-ended signal generator configured to generate a single-ended signal based on the error signal and an output signal from the ripple extractor, and a switch drive unit configured to drive and control, based on the single-ended signal, a switch circuit which sets the first node to the first direct current voltage or the second direct current voltage.

Embodiments will now be explained with reference to the accompanying drawings.

(First Embodiment)

FIG. 1 is a block diagram showing a schematic structure of a DC-DC converter 1 according to a first embodiment. The DC-DC converter 1 of FIG. 1 uses direct current input voltage Vin to generate direct current voltage (output voltage) Vout for driving a load 10, and is characterized in performing control to keep the voltage level of the output voltage Vout constant even when the current flowing through the load 10 varies.

The DC-DC converter 1 of FIG. 1 has a power stage 2 and a controller 3. The power stage 2 has a High-side switch SWH and a Low-side switch SWL, an inductor L, and a capacitor C. The High-side switch SWH and Low-side switch SWL are connected in series between a node at the input voltage (first direct current voltage) Vin and a node at ground voltage (second direct current voltage) Vss, and are turned on or off in a complementary style to set an intermediate node (first node) n1 to the input voltage Vin or the ground voltage Vss. The inductor L is interposed between the intermediate node n1 and a node at the output voltage Vout (second node). The capacitor C is interposed between the node at the output voltage Vout and the node at the ground voltage Vss.

The controller 3 has impedance elements R1 and R2, an error amplifier (error signal generator) 4, a lowpass filter (ripple extractor) 5, an adder 6, a single-input amplifier 7, and a switch drive circuit (switch drive unit) 8. The impedance elements R1 and R2 are connected in series between the node at the ground voltage Vss and the node at the output voltage Vout, and divided voltage Vfb of the output voltage Vout is outputted from an intermediate node n2 between the impedance elements R1 and R2. The error amplifier 4 generates an error signal depending on a voltage difference (Vfb-Vref) between reference voltage Vref and the divided voltage Vfb. The lowpass filter 5 extracts ripple components contained in the voltage of the intermediate node n1 between the High-side switch SWH and Low-side switch SWL. The adder 6 generates a signal by adding the error signal to the output signal from the lowpass filter 5. The single-input amplifier 7 buffers the output signal from the adder 6 and supplies it to the switch drive circuit 8. The switch drive circuit 8 generates a control signal for switching the High-side switch SWH and Low-side switch SWL on or off based on the output signal from the single-input amplifier 7. The adder 6 and single-input amplifier 7 constitute a single-ended signal generator.

The High-side switch SWH and Low-side switch SWL in the power stage 2 operate in a complementary style. That is, when the High-side switch SWH is turned on, the Low-side switch SWL is turned off. At this time, voltage VLX of the intermediate node n1 is equal to the input voltage Vin, and current IL of the inductor L increases. On the other hand, when the High-side switch SWH is turned off, the Low-side switch SWL is turned on. At this time, the voltage VLX of the intermediate node n1 is equal to the ground voltage Vss (=0V), and the current IL of the inductor L decreases.

The inductor L and capacitor C connected in series between the intermediate node at the voltage VLX and the node at the ground voltage Vss smooth the intermediate voltage VLX, and the output voltage Vout is outputted from an intermediate node Vout between the inductor L and capacitor C.

The controller 3 performs feedback control so that the divided voltage Vfb of the output voltage Vout (i.e., Vout×R1/(R1+R2)) becomes equal to the reference voltage Vref. The output voltage Vout can be expressed as in the following Formula (1).

$$Vout = Vref(R1+R2)/R1 \quad (1)$$

The intermediate voltage VLX between the switches SWH and SWL is square wave voltage set to the input voltage Vin or the ground voltage Vss. Accordingly, by optimizing the time constant of the lowpass filter 5, output voltage Vripple of the lowpass filter 5 rises when the intermediate voltage VLX=the input voltage Vin, and falls when the intermediate voltage VLX=the ground voltage Vss. The voltage Vripple has a waveform similar to that of the current IL flowing through the inductor L. The phase of the current IL of the inductor L is advanced by 90 degrees compared to the output voltage Vout. In the present embodiment, ripple components proportional to the current IL of the inductor L are fed back to securely stabilize the control loop of the DC-DC converter 1. Such a control system is called ripple control.

On the other hand, the voltage difference (error voltage) between the reference voltage Vref and the divided voltage Vfb correlating with the output voltage Vout is controlled to be fed back after amplified by the gain of the error amplifier 4. Accordingly, direct current voltage errors (DC errors) contained in the output voltage Vout are suppressed depending on the gain of the error amplifier 4.

The adder 6 adds the ripple components extracted by the lowpass filter 5 to the output signal from the error amplifier 4. Thus, the error amplifier 4 is required to sufficiently amplify only direct current voltage components, and the bandwidth of the error amplifier 4 may be narrow. In this way, operating current of the error amplifier 4 can be reduced.

The output signal from the adder 6 contains the ripple components extracted by the lowpass filter 5 and the DC error components detected by the error amplifier 4. Therefore, the single-input amplifier 7 buffers and outputs a single-ended signal containing the ripple components extracted by the lowpass filter 5 and the DC error components detected by the error amplifier 4. The single-input amplifier 7 also performs control to adjust the gain of the single-ended signal or to invert logic, as needed. The single-ended signal outputted from the single-input amplifier 7 is inputted into the switch drive circuit 8.

In the DC-DC converter 1 of FIG. 1, all of the internal parts may be mounted on one semiconductor substrate, or at least a part of the parts may be mounted on a separate substrate. For example, the High-side switch SWH and Low-side switch SWL may be mounted on a substrate separated from a semiconductor substrate on which the other parts are mounted. In this case, a semiconductor chip obtained by mounting the parts except for the High-side switch SWH and Low-side switch SWL on one semiconductor substrate forms a DC-DC converter control circuit.

As stated above, in the present embodiment, the ripple components extracted by the lowpass filter 5 and the DC error components detected by the error amplifier 4 are combined into a single-ended signal by the adder 6 and then buffered in the single-input amplifier 7. Since there is no need to input a ripple component signal and a DC error component signal into a differential circuit such as a differential input comparator, power consumption can be restrained. In particular, according to the present embodiment, efficiency of DC-DC conversion at the time of a light load can be improved.

(Second Embodiment)

A second embodiment to be explained below is obtained by more concretizing the first embodiment.

FIG. 2 is a circuit diagram of the DC-DC converter 1 according to the second embodiment. The DC-DC converter 1 of FIG. 2, whose configuration is basically the same as FIG. 1, has the power stage 2 and the controller 3. In the power stage 2, the High-side switch SWH is a PMOS transistor, and the Low-side switch SWL is an NMOS transistor.

The lowpass filter 5 in the controller 3 of FIG. 2 has an impedance element Rlpf and a capacitor Clpf connected in series between the intermediate node n1 at the voltage VLX between the High-side switch SWH and Low-side switch SWL and the node at the output voltage Vout. An intermediate node n3 between Rlpf and Clpf is the output node of the lowpass filter 5. Note that the other end of the capacitor Clpf may be connected to the node at the ground voltage Vss, instead of to the node at the output voltage Vout.

The error amplifier 4 is a current output amplifier which is inputted with differential signals and outputs a single-ended signal. The adder 6 is formed of a capacitor Cadd interposed between the output node of the lowpass filter 5 and the output node of the error amplifier 4. Since addition is performed using the capacitor C, no power is consumed in the adder 6. DC components contained in the ripple voltage Vripple outputted from the output node of the lowpass filter are removed through the action of the capacitor Cadd. On the other hand, the current outputted from the error amplifier 4 is converted into voltage components through integration performed by the capacitor Cadd. As stated above, the capacitor Cadd generates a signal by synthesizing the ripple components obtained by removing DC components from the output from the lowpass filter 5 and the voltage components corresponding to the current outputted from the error amplifier 4, and supplies the signal to the single-input amplifier 7.

The single-input amplifier 7 is formed of, e.g., a source-grounded circuit which can be realized as a simple circuit. The single-input amplifier 7 of FIG. 2 has a current source 9 and an NMOS transistor Q1 connected in series between a node at the input voltage Vin and a node at the ground voltage Vss. The buffered single-ended signal is outputted from the drain of the NMOS transistor Q1.

FIG. 3 is a circuit diagram showing a first example of the internal structure of the switch drive circuit 8 of FIG. 2. The switch drive circuit 8 of FIG. 3 has inverters IV1 and IV2 each of which buffers the single-ended signal outputted from the single-input amplifier 7, a pulse width converter 11 which generates a pulse signal having a predetermined pulse width in synchronization with the rising edge of the single-ended signal outputted from the inverter IV2 in the latter stage, and an inverter IV3 which buffers the output signal from the pulse width converter 11. The pulse width converter 11, which generates a pulse signal having a predetermined ON period, is called constant ON circuit.

FIG. 4 is a signal waveform diagram of a single-ended signal outputted from the single-input amplifier 7 of FIG. 3 and an output signal from the pulse width converter 11. As shown in FIG. 4, the pulse width converter 11 generates a pulse signal which is set to High for a predetermined period Ton from the rising edge of the single-ended signal.

Note that the pulse width converter 11 may generate a pulse signal which becomes Low for a predetermined period from the rising edge of the single-ended signal, or a pulse signal which becomes High or Low for a predetermined period from the falling edge of the single-ended signal. That is, the pulse width converter 11 generates a control signal having a preset pulse width which starts at the point when the single-ended signal changes to a predetermined logic.

As stated above, the pulse width converter 11 generates a pulse signal which becomes High or Low for a predetermined period. By previously adjusting the pulse width to be set to High or Low as needed, the ON period of the High-side switch SWH and Low-side switch SWL can be optimized.

The internal structure of the switch drive circuit 8 should not be limited to that shown in FIG. 3. FIG. 5 is a circuit diagram showing a second example of the internal structure of the switch drive circuit 8 of FIG. 2. The switch drive circuit 8 of FIG. 5 has a delay unit 12 instead of the pulse width converter 11 of FIG. 4. As shown in FIG. 6, the delay unit 12 generates a pulse signal which is delayed from the single-ended signal by a predetermined period Td.

When generating a delay signal, the delay unit 12 may delay the single-ended signal while inverting its logic. The delay unit 12 generates a control signal which is delayed by a preset delay time from the point when the single-ended signal changes to a predetermined logic.

As stated above, in the second embodiment, the error amplifier 4 formed as a current output amplifier and the adder 6 formed of the capacitor C make it possible that no power is consumed when the adder 6 adds ripple components to error voltage components. In this way, reduction in power consumption can be realized. Further, the single-input amplifier 7 formed as a source-grounded circuit having a simple circuit configuration realizes reduction in its circuit scale.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A DC-DC converter control circuit comprising:
   an inductor which is interposed between a first node that is set to one of a first direct current voltage and a second direct current voltage and a second node that outputs an output voltage at a predetermined direct current voltage level;
   an error signal generator which generates an error signal depending on a voltage difference between a reference voltage and a voltage correlating with the output voltage;
   a ripple extractor which extracts and outputs ripple components contained in a voltage of the first node;
   a single-ended signal generator which generates a single-ended signal based on the error signal and an output signal from the ripple extractor; and
   a switch drive unit which drives and controls, based on the single-ended signal, a switch circuit which sets the first node to the one of the first direct current voltage and the second direct current voltage,
   wherein the error signal generated by the error signal generator is a current signal, and
   wherein the single-ended signal generator generates the single-ended signal by removing direct current voltage components contained in the output signal from the ripple extractor, and converting the current signal into a voltage signal through integration.

2. The DC-DC converter control circuit of claim 1, wherein the single-ended signal generator comprises:
   an adder which adds an output signal from the error signal generator to the output signal from the ripple extractor; and
   a single-input amplifier which generates the single-ended signal by buffering an output signal from the adder.

3. The DC-DC converter control circuit of claim 2, wherein the adder comprises a capacitor which removes the direct current voltage components contained in the output signal from the ripple extractor, and which converts the current signal corresponding to the error signal into the voltage signal through integration.

4. The DC-DC converter control circuit of claim 1, wherein the single-input amplifier is a source-grounded circuit.

5. The DC-DC converter control circuit of claim 1, wherein the switch drive unit generates a control signal having a preset pulse width which starts at a point when the single-ended signal changes to a predetermined logic, and
   wherein the switch circuit is controlled to be turned on or off based on the control signal.

6. The DC-DC converter control circuit of claim 1, wherein the switch drive unit generates a control signal which is delayed by a preset delay time from a point when the single-ended signal changes to a predetermined logic, and
   wherein the switch circuit is controlled to be turned on or off based on the control signal.

7. A DC-DC converter comprising:
   a switch circuit which sets a first node to one of a first direct current voltage and a second direct current voltage;
   an inductor which is interposed between the first node and a second node that outputs an output voltage at a predetermined direct current voltage level;
   an error signal generator which generates an error signal depending on a voltage difference between a reference voltage and a voltage correlating with the output voltage;
   a ripple extractor which extracts and outputs ripple components contained in a voltage of the first node;
   a single-ended signal generator which generates a single-ended signal based on the error signal and an output signal from the ripple extractor; and
   a switch drive unit which drives and controls the switch circuit based on the single-ended signal,
   wherein the error signal generated by the error signal generator is a current signal, and
   wherein the single-ended signal generator generates the single-ended signal by removing direct current voltage components contained in the output signal from the ripple extractor, and converting the current signal into a voltage signal through integration.

8. The DC-DC converter of claim 7, wherein the single-ended signal generator comprises:

an adder which adds an output signal from the error signal generator to the output signal from the ripple extractor; and a single-input amplifier which generates the single-ended signal by buffering an output signal from the adder.

9. The DC-DC converter of claim 8, wherein the adder comprises a capacitor which removes the direct current voltage components contained in the output signal from the ripple extractor, and which converts the current signal corresponding to the error signal into the voltage signal through integration.

10. The DC-DC converter of claim 7, wherein the single-input amplifier is a source-grounded circuit.

11. The DC-DC converter of claim 7, wherein the switch drive unit generates a control signal having a preset pulse width which starts at a point when the single-ended signal changes to a predetermined logic, and wherein the switch circuit is controlled to be turned on or off based on the control signal.

12. The DC-DC converter of claim 7, wherein the switch drive unit generates a control signal which is delayed by a preset delay time from a point when the single-ended signal changes to a predetermined logic, and wherein the switch circuit is controlled to be turned on or off based on the control signal.

* * * * *